United States Patent [19]

Sweeney et al.

[11] 3,903,582

[45] Sept. 9, 1975

[54] MULTIPLE SEGMENT FASTENER AND METHOD

[75] Inventors: Theodore J. Sweeney, Grosse Pointe; Donald H. Ettinger, Royal Oak, both of Mich.

[73] Assignee: USM Corporation, Boston, Mass.

[22] Filed: June 7, 1973

[21] Appl. No.: 367,719

[52] U.S. Cl. ................. 29/411; 29/455; 29/470.5; 29/475; 29/509; 52/621; 52/758 D; 219/107
[51] Int. Cl. ............................................. B23p 17/00
[58] Field of Search ............ 29/455, 526, 411, 475, 29/470.5, 509; 138/149; 52/404, 758 D, 621; 85/1 R; 219/101, 107

[56] References Cited
UNITED STATES PATENTS

| | | | |
|---|---|---|---|
| 1,238,206 | 8/1917 | Shuler | 29/526 UX |
| 1,340,412 | 5/1920 | Schmidt | 219/107 |
| 2,765,152 | 10/1956 | Hagby et al. | 219/107 X |
| 3,147,832 | 9/1964 | Saro | 52/621 X |
| 3,455,360 | 7/1969 | Simons | 85/1 R X |
| 3,579,802 | 5/1971 | Gajonski | 29/455 X |
| 3,702,024 | 11/1972 | Baker | 29/455 X |

*Primary Examiner*—Charlie T. Moon
*Attorney, Agent, or Firm*—Burton and Parker

[57] ABSTRACT

A multiple segment male fastener adapted to secure a part to a support, including a plurality of elongate wires of a length substantially exceeding the ultimate length of the fastener arranged in contiguous relation to provide a separable fastener, one end of which is fixed to the support as by welding, with the fastener elements being thereafter severed at a point spaced from the support a distance greater than the thickness of the part to be secured thereto, the free end of the fastener being bent into overlying relation with said part to secure the part to the support. The multiple segments of the fastener are preferably physically bonded together with a breakable bond, and/or are twisted tightly together to provide a relatively rigid fastener structure.

The method disclosed comprises feeding at least one elongate wire generally perpendicular to a support surface and end welding the wire to the surface, cutting the wire at a point spaced from the support surface to provide a fastener upstanding from the support, deforming the free end of the fastener into overlying relation with a part on the support, and repeating the steps to provide a plurality of fasteners securing the part to the support.

8 Claims, 13 Drawing Figures

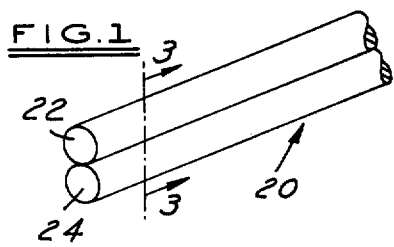
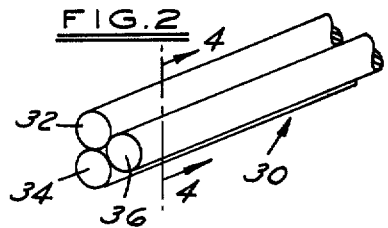
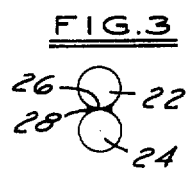
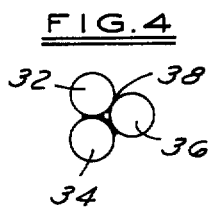
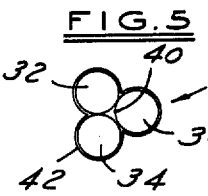
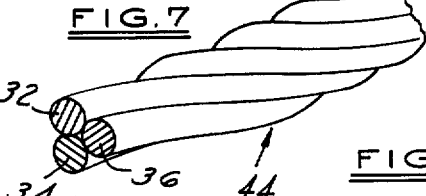
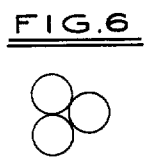
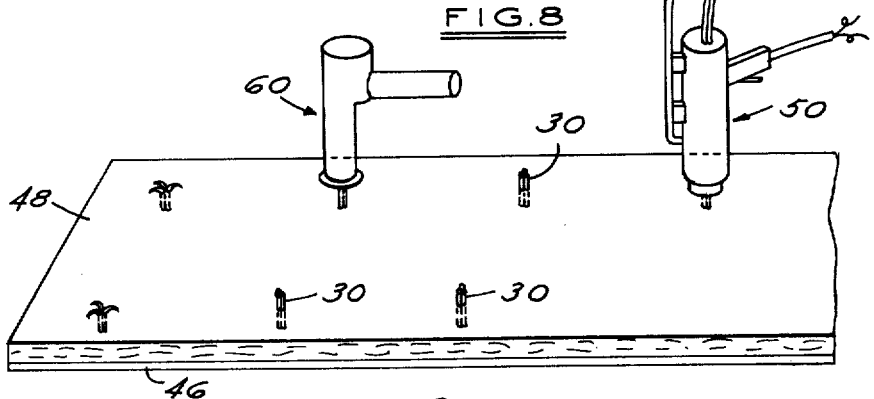
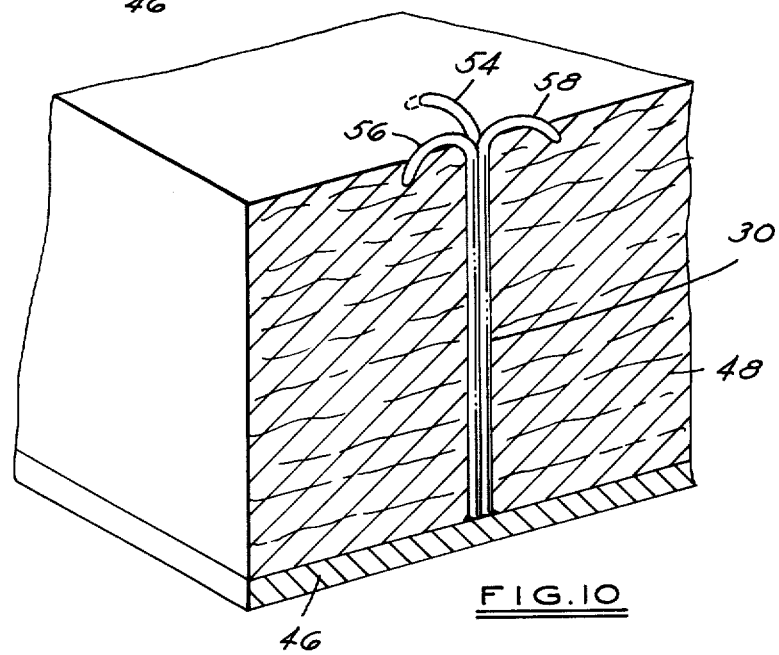

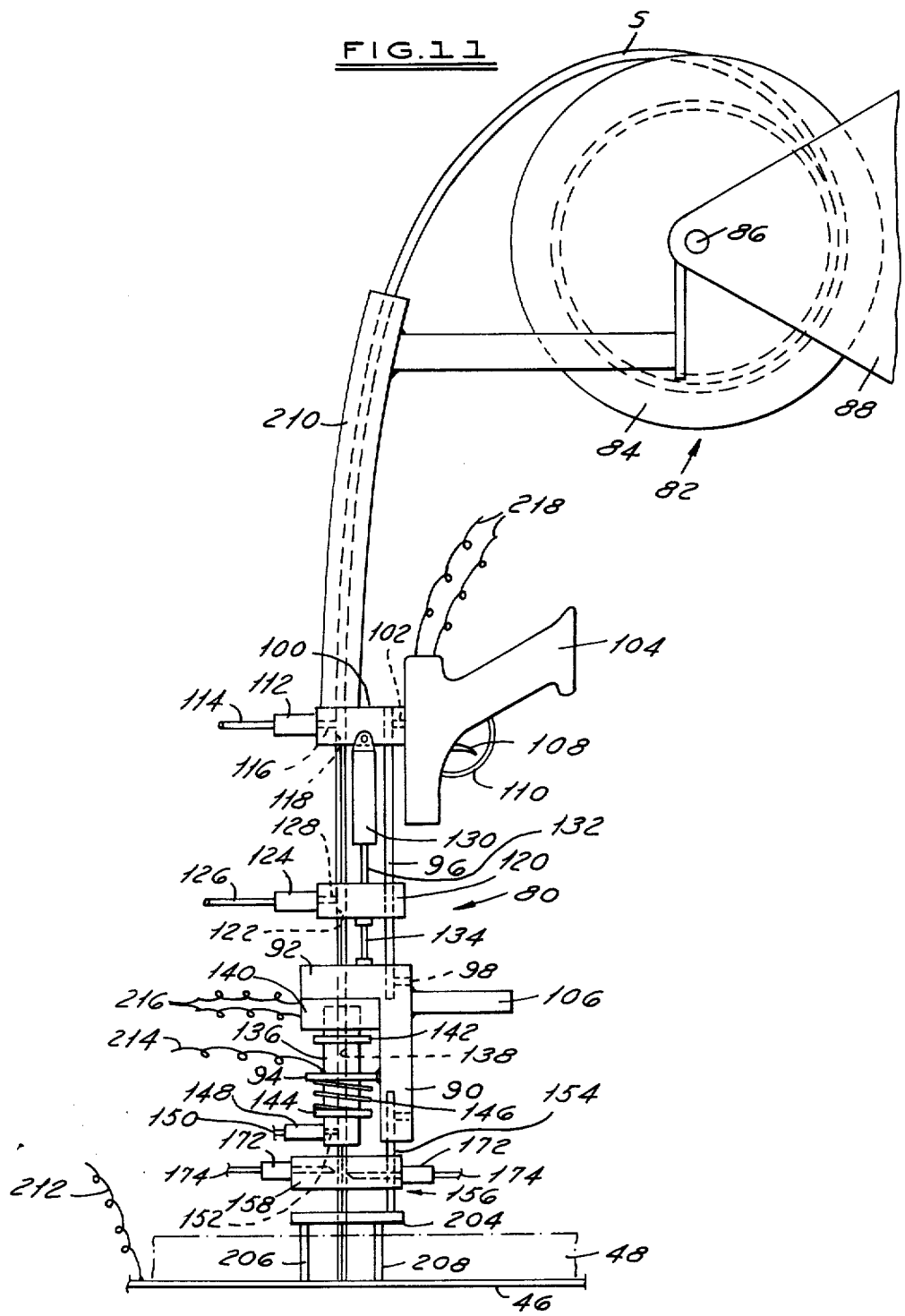

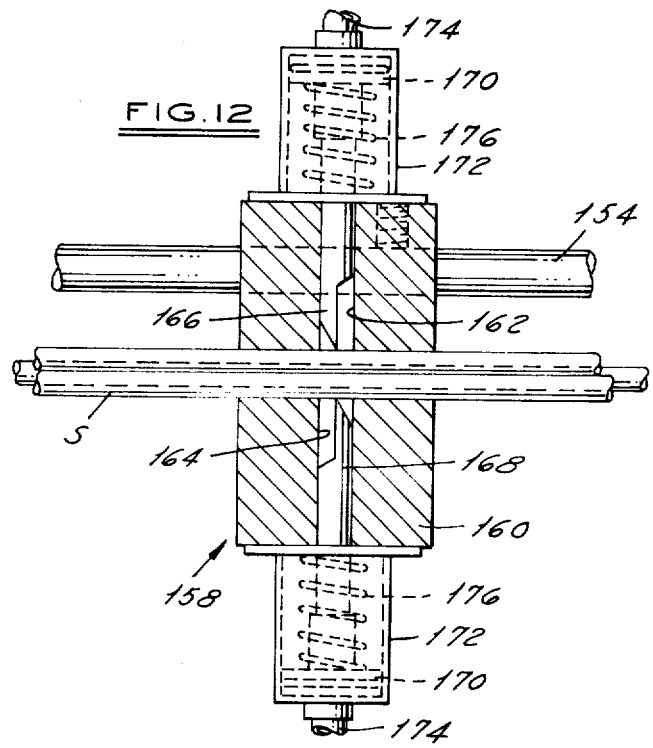
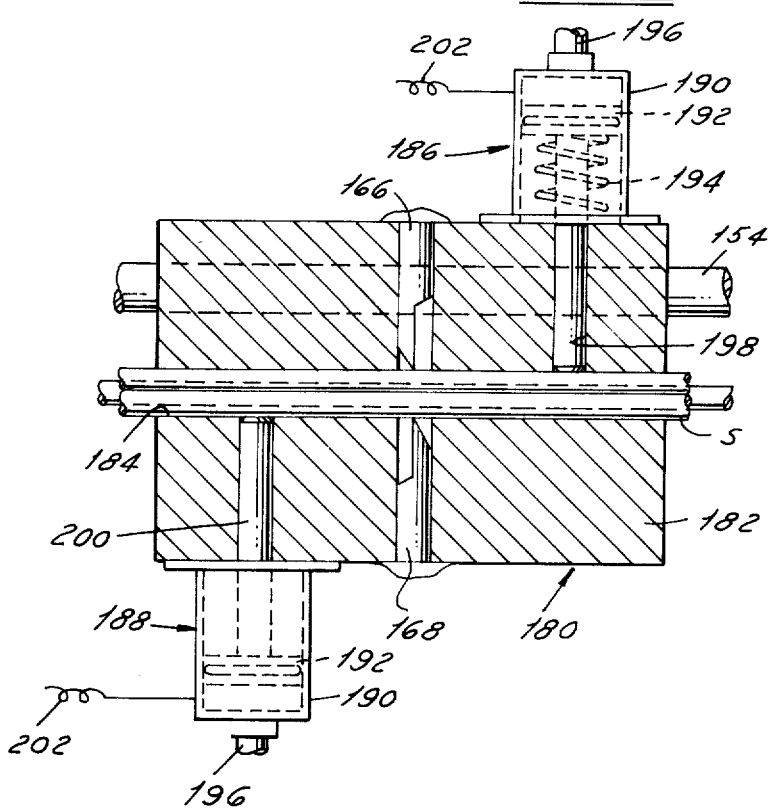

MULTIPLE SEGMENT FASTENER AND METHOD

1. Field of the Invention

The invention relates to multiple segment male fasteners, including weld-on fasteners, adapted to secure a part to a support, and to a method for securing a part to a support by a plurality of fasteners which are secured to the support and thereafter deformed to overlie a part and retain such part to the support.

2. Description of the Prior Art

The prior art is replete with various types of male fasteners, including rivets, end-welded studs, and the like utilized to secure two or more parts together. The basic disadvantage of rivets is that their use requires drilling or piercing a hole through which the rivet extends, which creates an erosion problem, especially where the materials are electrolytically dissimilar, due to moisture collection around the rivet hole. End-welded studs have found wide commercial acceptance and include threaded fasteners to which a nut or the like may be secured, and studs having deformable heads which are upset to retain the parts together. These fasteners are generally of relatively complex construction, and are therefore expensive to manufacture.

Within recent years, various weld-on fasteners have been developed which have received commercial acceptance, particularly in the automotive and appliance field, for securing trim and other devices. In the construction field, securement of relatively lightweight porous material such as insulation and the like have been successfully secured by a so-called cup head pin which is welded to the support for the insulation and projects through the insulation and overlies the surface thereof remote the support. Such fasteners have taken two forms, one comprising a male stud having an enlarged washer underlying its head which is projected through the layer of insulation into contact with the panel and thereafter welded thereto, and the other wherein a pin is first welded to the panel and the insulation engaged on the pin with the free end of the pin thereafter being deformed to overlie the insulation.

Multiple strand or segment male fastener elements are also known, as exemplified by U.S. Pat. Nos. 36,014 and 3,455,360. In the former patent, the multiple stranded fastener in the form of a wire rope is provided with the strands of the wire welded together and thereafter threaded to receive a nut. In the latter patent there is disclosed a plurality of separate and distinct shank portions which are twisted about a central elongated rod or wire and thereafter externally threaded to provide a vibration-resistant screw member.

All of the above noted male fasteners suffer from the same deficiency, namely that they are manufactured in predetermined lengths, and thus a multiplicity of different length fasteners must be stocked in order to enable the fastening of parts having various thicknesses.

SUMMARY OF THE INVENTION

The male fastener of this invention is adapted to secure an article or part to a support such as a sheet metal panel, structural beam, or the like. The article to be secured may comprise a mat or blanket of relatively light material such as insulation or the like. The male fastener comprises a plurality of elongate wires which are formed into a dimensionally stable structure secured to a support and upstanding therefrom, said plurality of wires being severed a predetermined distance from the support surface. The fastener has an article-retaining portion overlying the surface of the article spaced from the support, said retaining portion being formed in situ and comprising free ends of said wires separated from each other and deformed radially outwardly and downwardly into engagement with the article.

The method of the invention includes feeding at least one fastener element of a length substantially greater than the ultimate fastener, holding the element and positioning its end against the support, end-welding said end to the support, cutting the element at a predetermined point spaced from the support surface to form an upstanding fastener, and deforming the upstanding free end of the fastener to overlie the article and secure the latter to the support.

BRIEF DESCRIPTION OF THE DRAWINGS

FIG. 1 is a partial perspective of one embodiment of the male fastener of this invention;

FIG. 2 is a partial perspective of another embodiment of the male fastener of this invention;

FIG. 3 is a cross-section taken along the line 3—3 of FIG. 1;

FIG. 4 is a cross-section taken along the line 4—4 of FIG. 2;

FIG. 5 is a view similar to FIG. 4 showing a modification of the fastener of FIG. 2;

FIG. 6 is a cross-section similar to FIGS. 4 and 5 showing a further modification;

FIG. 7 is a partial perspective similar to FIGS. 1 and 2 showing another embodiment of the male fastener of the invention;

FIG. 8 is a perspective view schematically showing the method of the invention including welding the male fasteners to a support extending through an article to be secured to the support, and deforming the free ends of the fasteners to overlie the article;

FIG. 9 is a partial perspective showing the male fastener embodying the invention after welding to the support and severing, and before deformation of the free ends of the fastener;

FIG. 10 is a partial perspective with a cross-section showing the male fastener of the invention retaining an article to a support;

FIG. 11 is a side elevation of apparatus schematically showing the method of welding a male fastener element to a support and cutting the element to provide a fastener having a predetermined length;

FIG. 12 is a cross-section showing the means for cutting the male fastener after welding; and FIG. 13 is a cross-section showing means for cutting the male fastener with heat applied thereto to facilitate the cutting operation.

DESCRIPTION OF THE PREFERRED EMBODIMENTS

In FIGS. 1–7 inclusive, fasteners embodying the instant invention are shown, and as can be seen from an examination of such Figs., each fastener comprises a plurality of wires extending in contiguous relation. In FIGS. 1 and 3, for example, a fastener 20 is shown comprising a pair of wires 22 and 24 which are secured together along their line of contiguity 26. In FIG. 3, the two wires 22 and 24 are illustrated as being secured together by welding, the weld fillet being identified by the numeral 28.

In FIG. 2 there is shown a further embodiment of a fastener 30 which comprises three contiguous wires 32, 34 and 36. The three-wire fastener of FIG. 2 may be formed in the same fashion as the two-wire fastener 20 illustrated in FIG. 1, namely the wires may be welded together as illustrated in FIG. 4, the weld fillet being indicated at 38. In providing the two-wire fastener 20 of FIG. 1 or the three-wire fastener 30 of FIG. 2, the wires might be spot-welded together at spaced points along their length, or they could just as advantageously be seam-welded together continuously along their length.

In FIG. 5 there is illustrated in cross-section a fastener 30' similar to the fastener 30 of FIG. 2, except that instead of welding the fastener elements 32, 34 and 36 together, they are secured by bath plating or bath sweating, in which event the deposit metal would substantially fill the area 40 between the wires, and in addition, the exterior surfaces of the wires would be covered with the metal, as indicated at 42. The bath plating operation would be accomplished by the electrodeposition of plating metal, while the bath sweating would be accomplished by heating the deposit metal to its melting temperature and passing the wires 32, 34 and 36 through the molten metal to effect the bond.

In FIG. 7 there is illustrated a further embodiment of a three-wire fastener 44, comprising the three-wire elements 32, 34 and 36 which are twisted together to form a fastener element, rather than being actually bonded together as described hereinabove. It will be apparent to those skilled in the art that the twisted fastener 44 illustrated in FIG. 7 could be welded, soldered, plated or the like similar to the fasteners shown in the preceding Figs., in addition to being twisted as shown, if such were necessary to provide an integral fastener capable of being end-welded to a support. FIG. 6 shows an end elevation of the three-wire fastener including the wires 32, 34 and 36, the wires having been seam-welded along their points of contiguity to provide a self-supporting fastener element.

The wires forming the fasteners 20, 30 and 44 above described may be secured together in any of a variety of manners to provide a fastener which is of sufficient rigidity and electrical conductivity to be welded to a support and thereafter deformed to provide a fastener having the requisite physical properties to retain an article on the support as hereinafter more fully delineated. In environments where corrosion is a problem, the wires may be bath soldered in a zinc bath, which would enhance the non-corrosive properties of the fastener. The wires might also be bathed in a suitable plastic bonding material, which would also enhance the non-corrosive properties of the fastener. In applications where corrosion is not a prime factor, the wires may be seam or spot welded together, or may be twisted, as illustrated in FIG. 7. The twisted fastener of FIG. 7 may be additionally welded, soldered or bath plated to further insure that the wires will not separate during handling.

FIG. 8 illustrates a method of fastening an article to a support utilizing the fasteners shown in FIGS. 1–7, the fastener 30 of FIG. 2 being specifically shown in FIG. 8. The instant invention is of particular utility in securing a resilient material of an appreciable thickness to a relatively rigid support such as a metal panel or the like. Illustrated in FIG. 8 is a metal panel 46 serving as a support for a relatively thick, resilient article, such as a batt of insulation material or the like 48. In order to secure the batt 48 to the panel 46, fasteners 30 are welded to the panel and thereafter deformed to provide multiple retaining elements. A welding gun 50 is shown in FIG. 8, to which the elongate fastener stock S is fed, and the end of the fastener stock is welded to the panel 46 and thereafter cut off to provide a fastener of sufficient length to project beyond the member 48 a distance sufficient to enable the free ends of the fastener to be deformed to secure the article 48 to the panel 46.

In FIG. 9 there is shown an individual fastener 30 which has been welded to the panel 46 substantially perpendicular thereto, the fastener being cut off at 52 to provide a fastener of predetermined length. After the fastener has been welded and cut, the fastener free ends may be deformed outwardly and downwardly into contact with the article 48 to retain the latter against the panel, as indicated at 54, 56 and 58 in FIG. 10. A tool for curling the ends 54, 56 and 58 of the fastener 30 is schematically shown at 60 in FIG. 8.

Depending upon the physical properties of the article 48, the operation may be performed in a variety of ways. If the article is fairly porous and of quite low density, it may be placed in position over the panel 46, and a plurality of fastener elements 30 welded to the panel by merely piercing the member 48, welding a fastener element, cutting the fastener to its predetermined length, and thereafter curling over the ends of the fastener to provide the finished assembly as shown in FIG. 10. By utilizing a relatively long piece of fastener stock, many fasteners may be provided from a single piece of stock, and may be rapidly welded to the panel.

If the element 48 is of such a characteristic that it cannot be conveniently pierced in situ by the fastener element 30, with the fastener being welded while projecting through the element 48, other manners of securement may be resorted to. For example, apertures might be provided in the article 48 in a predetermined pattern, and with the member 48 placed in position overlying the panel 46, the fasteners could be inserted through the apertures and welded to the panel, and thereafter deformed to their position as indicated in FIG. 10. Another way of accomplishing the same result would be to first weld the fasteners on to the panel to provide a plurality of fastener elements 30 of the character as shown in FIG. 9, and then to force the member 48 down over the elements, thereby piercing the member, and thereafter deform the free fastener ends as indicated in FIG. 10.

In FIGS. 11, 12 and 13, there is illustrated, somewhat schematically, apparatus for welding and severing fasteners of the character shown in FIGS. 1–7 inclusive, wherein the fasteners are fed to the welding tool in the form of a continuous length of fastener stock, are welded to the support panel, and thereafter cut to a predetermined length to form individual fasteners of the character shown in FIG. 9.

Referring first to FIG. 11, there is shown a welding apparatus generally indicated at 80 to which is fed a long length of fastener stock S from a reel unit or the like 82. The assembly 82 comprises a wire reel 84 upon which is wound the fastener stock S, the reel being mounted for rotation on a shaft 86 which is supported at opposite ends in a bracket 88. While the wire reel assembly 82 as shown is of very simple construction, it will be apparent to those skilled in the art that there are available various commercial wire reels which would be suitable for this application. It should also be noted that a wire reel could be provided having a wire feed mechanism to positively feed the fastener stock S from the reel to the welding apparatus 80. If a positive wire feed were employed in the reel assembly 82, its operation could be synchronized and co-ordinated with the wire feed mechanism on the apparatus 80, which is described hereinbelow.

The welding apparatus 80 of FIG. 11 includes a main frame 90 having an upstanding block portion 92 at the rear end thereof, and an upstanding bracket 94 spaced forwardly of the block 92. Extending rearwardly from the frame 90 is a framing rod 96, which is secured to the frame in any convenient fashion, as by a set screw 98. Mounted at the rear end of the framing rod 96 is a clamping block 100, which is likewise secured to the rod by a set screw or the like 102. Depending from clamping block 100 is a pistol-grip type handle 104, while depending from the main frame 90 is an auxiliary handle member 106, the members 104 and 106 providing means by which an operator may hold and manipulate the welding apparatus 80 with both hands. The pistol-grip handle 104 is provided with an actuating trigger 108 and a trigger guard 110, the trigger being actuatable to initiate the welding cycle. Mounted atop the clamping block 100 is an air cylinder 112 having an air line 114 connected thereto, the cylinder 112 having a clamping member 116 shiftable into clamping engagement with the fastener stock S which extends through aperture 118 in block 100.

Spaced forwardly of clamping block 100 is a feed block 120 supported for slidable movement on framing rod 96 and apertured as at 122 to accommodate the fastener stock S. Air cylinder 124, similar to cylinder 112, is mounted with its air line 126 atop feed block 120, and has a clamping member 128 engageable with fastener stock S. An air cylinder 130 is pivotally connected to clamping block 100, and has an extendable piston 132 fixed to feed block 120. Upon actuation of air cylinder 124 to urge clamp 128 into engagement with fastener stock S, cylinder 130 is pressurized, extending rod 132 to shift the feed block 120 and the fastener wire 30 forwardly a predetermined distance. Projecting rearwardly from the main frame portion 92 is a stop rod 134, against which the feed block 120 abuts, thereby providing a positive stop for the wire feed. Stop rod 134 is preferably threaded into member 92, and its effective length is variable to provide adjustment in the length of fastener stock fed upon actuation of cylinder 130.

Frame bracket 94 is apertured to reciprocably support a spindle 136, the spindle having an axial passage 138 through which the fastener stock S extends. Fixed to the forwardly facing surface of frame member 92 is a solenoid coil 140, into which the rear end of the spindle 136 projects as shown. The spindle 136 is additionally provided with a pair of spaced collars 142 and 144, the rear collar 142 serving as a stop for the spindle 144 retaining a spindle plunge spring 146, which urges the spindle toward the panel or support 46. On the forward end of the spindle 136 is mounted a second clamping cylinder 148 having an air supply line 150 and a wire clamping member 152, the operation of which will be described more fully hereinbelow.

Spaced forwardly of the clamping cylinder 148, and mounted to the main frame 90 by a framing rod 154, is a wire cutting assembly 156 for severing the fastener stock S after welding to the panel member 46. The cutter assembly 156 comprises an elongate block 158 having a central passage 160 opening therethrough to accommodate the fastener stock S, and a pair of vertical, aligned passages 162 and 164, as shown most clearly in FIG. 12. Disposed within each of the vertical passages is a wire cutting member 166 and 168 respectively, which are reciprocable within the passages to sever the fastener stock S and provide the individual fastener of predetermined length welded to the panel 46, such as is shown in FIG. 9.

Connected to the outer end of each cutter 166 and 168 is a fluid pressure operated piston 170 which reciprocates within a cylinder 172, the outer end of the cylinder being connected to a pressure fluid line 174. Each of the pistons 170 is biased by a spring 176 to its retracted position, whereby upon pressurization of the lines 174, the cutters 166 and 168 are shifted toward each other to sever the fastener stock S, and upon depressurization of the lines 174, the cutters are spring returned by the springs 176 to their at-rest position shown in FIG. 12.

In FIG. 13 there is shown a modified wire cutter assembly 180, which includes a block 182 similar to the block 160 previously described, and having a fastener passage 184 opening therethrough accommodating the fastener stock S. The assembly 180 is provided with identical cutters 166 and 168 as that previously described, and such are actuated by the fluid pressure motors shown in FIG. 12, which are not shown in FIG. 13 to simplify the drawing. Spaced on opposite sides of the cutters 166 and 168 are a pair of heater assemblies 186 and 188 which are identical, a description of one sufficing for both.

Each heater assembly comprises a cylinder 190 having a piston 192 reciprocably disposed therein and biased by a spring 194. The cylinder 190 communicates with a source of fluid under pressure through line 196. Connected to the piston and extending through an aperture 198 in the block is a heater element 200 in the form of a piston rod, the inner end of the heater element 200 engageable with the fastener stock S as shown in FIG. 13. Each of the heater elements is heated electrically, an electrical connection being shown schematically at 202. Upon pressurization of the lines 196, the heater elements 200 are shifted into contact with the fastener stock S on opposite sides of the cutters 166 and 168, and upon the passage of electrical current through the members 200 and the fastener stock S, the latter will be heated sufficiently to facilitate cutting of the fastener stock by the cutters 166 and 168.

Referring back to FIG. 11, there is mounted on the forward end of framing rod 154 a plate member 204 centrally apertured to receive the fastener stock S, and a plurality of locating prongs, two of which are shown at 206 and 208, fixed to the plate 204 and projecting forwardly therefrom for engagement with the panel 46. The prongs 206 and 208 serve to locate the welding apparatus 80 with respect to the panel 46 during the welding operation.

Referring now particularly to FIG. 11, it can be seen that the fastener stock S may be wound upon the reel 84, from whence it may be fed through a flexible but noncollapsible guide tube member 210 to the welding apparatus 80, the fastener stock S being initially manually fed through the welding apparatus and therebeyond until its free end lies in the plane of the ends of the prongs 206 and 208. The panel 46 to which the fasteners are to be welded is grounded by a connector 212, while welding current is supplied to the tool 80 through a conductor 214 connected to spindle 136. Electrical leads 216 are connected to the solenoid coil 140 for actuation of the solenoid, while additional electrical leads 218 are coupled to the handle 104 which is provided with an internal switch (not shown) coupled to trigger 108. The various electrical connectors are coupled to a control module (not shown) which is operable to synchronize and control the various functions of the welding apparatus 80 sequentially to effect a securement and severing of the fastener stock as described hereinbelow.

Assuming that the fastener stock S has been fed into the welding apparatus 80 so that its forward end lies in the plane of the free ends of prongs 206 and 208, the clamps 100 and 120 are in their retracted position, while the clamp 148 is in its extended position clamping the fastener stock S. When it is desired to make a weld, the operator may support the apparatus 80 by gripping the handles 104 and 106, and then force the forward end of the welding apparatus toward the panel 46, thereby causing the prongs 206 and 208 and the fastener stock S to pierce the batt 48 and abut the panel 46, the relationship of parts then being in the position shown in FIG. 11. Actuation of the trigger 108 closing the circuit shown partially at 218 actuates the control to supply welding current through the conductor 214 to weld the fastener stock to the panel.

The welding cycle is preferably of the drawn arc type which is well known in the art and need not be described in detail. Briefly, upon initiation of the control circuit, solenoid 140 is energized through a conductor 216, thereby retracting the spindle 136 and withdrawing the fastener stock S away from the panel 46, striking an arc between the panel and the fastener end. Full welding current is thereafter supplied through line 214, and solenoid 140 is de-energized, allowing return spring 146 to plunge the spindle and the fastener carried thereby into the panel 46.

After the end of the fastener stock S has been welded to the panel 46, the cutter assembly is actuated, i.e. cylinders 172 are pressurized to shift the cutters 166 and 168 (FIG. 12) to sever the fastener stock S, and the apparatus 80 is thereafter retracted, leaving a fastener welded to the panel and upstanding therefrom as shown in FIG. 9. During the welding operation and the subsequent severing of the fastener stock, clamp 148 is energized, and clamps 100 and 120 are de-energized. Upon completion of the cutting operation, the clamp 120 is actuated to grip the stock S and cylinder 130 is pressurized to extend piston rod 132, thereby shifting clamp assembly 120 against stop 134 to feed an additional length of fastener stock into welding position. Once the feeding operation is complete clamp 120 is released, and clamp 100 is energized to hold the fastener stock in position and cylinder 130 is reversely pressurized to retract piston rod 132, thereby returning feed clamp 120 to its retracted position ready for the next feeding cycle. When the retraction of the feed clamp is complete, clamp 100 is again de-energized, and clamp 148 is energized to hold the fastener stock during the next successive welding operation.

It will be obvious to those skilled in the art that any of the fastener embodiments shown in FIGS. 1–7 inclusive may be utilized to accomplish the attaching and severing of fasteners above described. Referring back to FIG. 8, the fasteners 30 shown therein may be secured to the panel 46 in any given number and in any desired pattern, and thereafter a crimping tool shown schematically at 60 may be utilized to deform the ends of each fastener to overlie the pad or batt of insulation material or the like, as is shown most clearly in FIG. 10.

We claim:

1. The method of attaching an article to a support by a fastener secured at one end to the support surface and deformed at its opposite end in overlying relation against the surface of the article remote from the support, comprising: arranging a plurality of fastener elements in contiguous relation of a length substantially greater than the fastener; while holding said fastener elements in the aforesaid relation, positioning them adjacent the support generally perpendicular to the support surface; end welding the fastener elements to the support surface; cutting the fastener elements at a point spaced from the support surface to form a multiple segment fastener; and deforming the upstanding free ends of the element segments into overlying relation with an article previously assembled on the support to secure the article to the support.

2. The method of attaching an article to a support as defined in claim 1 characterized in that said fastener elements are elongate wires, and including the step of feeding said wires in said contiguous relation to said position adjacent the support.

3. The method of attaching an article to a support surface as defined in claim 2 characterized by twisting said wires together prior to end welding them against the support surface.

4. The method of attaching an article to a support surface as defined in claim 2 characterized by securing said wires together at spaced apart points along their length prior to welding them to the support surface.

5. The method of attaching an article to a support surface as defined in claim 1 characterized by cutting the fastener elements at a point spaced beyond said remote surface of said article, and thereafter deforming said elements by bending each of them away from the fastener axis to overlie said remote surface of the article.

6. The method of attaching an article to a support surface as defined in claim 1 characterized by positioning said article against the support surface prior to positioning said fastener elements thereadjacent, thereafter positioning said fastener elements extending through the article adjacent the support and end welding the elements to the support surface.

7. The method of attaching an article to a support surface as defined in claim 1 characterized by positioning said article against said support surface after cutting said fastener elements by inserting the article over the multiple segment fastener and thereafter deforming the upstanding free ends of the segments.

8. The method of attaching an article to a support surface as defined in claim 2 characterized by feeding a plurality of individual wires and arranging the wires into said parallel contiguous relation.

* * * * *